(12) United States Patent
Schneider et al.

(10) Patent No.: US 7,224,490 B2
(45) Date of Patent: May 29, 2007

(54) METHOD OF PRODUCING A PRINTING PLATE ON A CYLINDRICAL PRINTING-PLATE CARRIER IN A ROTARY PRINTING PRESS

(75) Inventors: Josef Schneider, Diedorf (DE); Armin Weichmann, Kissing (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 979 days.

(21) Appl. No.: 10/401,254

(22) Filed: Mar. 27, 2003

(65) Prior Publication Data
US 2004/0100659 A1   May 27, 2004

(30) Foreign Application Priority Data
Mar. 27, 2002   (DE)   ............................... 102 13 708

(51) Int. Cl.
*B41C 1/02*   (2006.01)
(52) U.S. Cl. .............. 358/3.29; 358/1.9; 358/3.01; 358/3.21; 101/142; 101/215; 101/217; 101/492; 101/484
(58) Field of Classification Search ............ 358/3.29
See application file for complete search history.

(56) References Cited

U.S. PATENT DOCUMENTS

| | | | |
|---|---|---|---|
| 5,500,801 A | 3/1996 | Löffler | |
| 5,602,970 A | 2/1997 | Janser | |
| 6,213,019 B1 * | 4/2001 | Muller | .................... 101/484 |
| 2002/0043172 A1 | 4/2002 | Hauck | |

* cited by examiner

*Primary Examiner*—Twyler Lamb
*Assistant Examiner*—Jacky X. Zheng
(74) *Attorney, Agent, or Firm*—Cohen Pontani Lieberman & Pavane LLP

(57) ABSTRACT

A method of producing a printing plate on a cylindrical printing-plate carrier includes subdividing the printing-plate carrier by computation in terms of its width and axial length into at least two circumferential subareas. Then an actual transfer characteristic curve for each subarea is determined and compared by computation with a predetermined desired printing characteristic curve for each subarea to find a deviation. The method further includes calculating a correction to compensate for each deviation; receiving a digital image data in a first data format using a raster image processor; converting the digital image data into machine-specific image data including the position and the tonal value in the form of a bitmap; applying the correction for a predetermined desired printing characteristic curve for the edition print to the machine-specific image data using the raster image processor; and supplying the corrected machine-specific image data to an imagesetting unit.

11 Claims, 2 Drawing Sheets

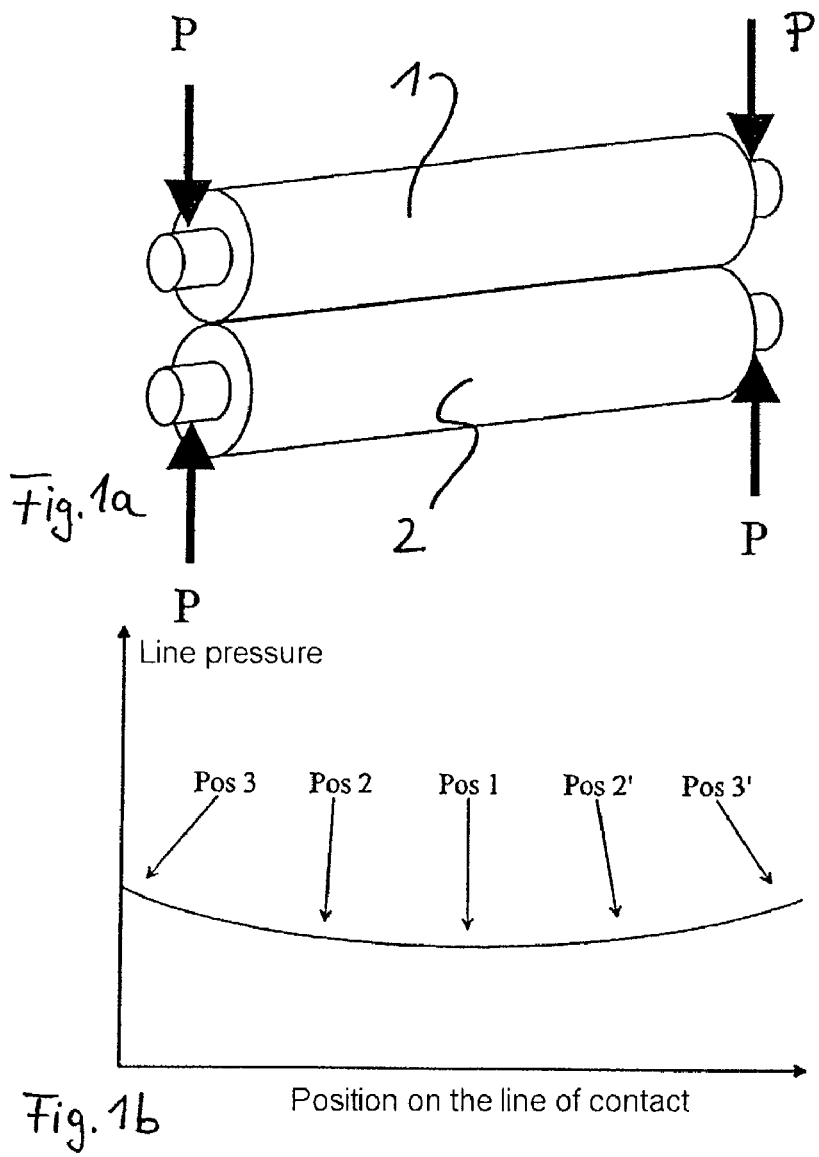
Fig. 1a
Fig. 1b
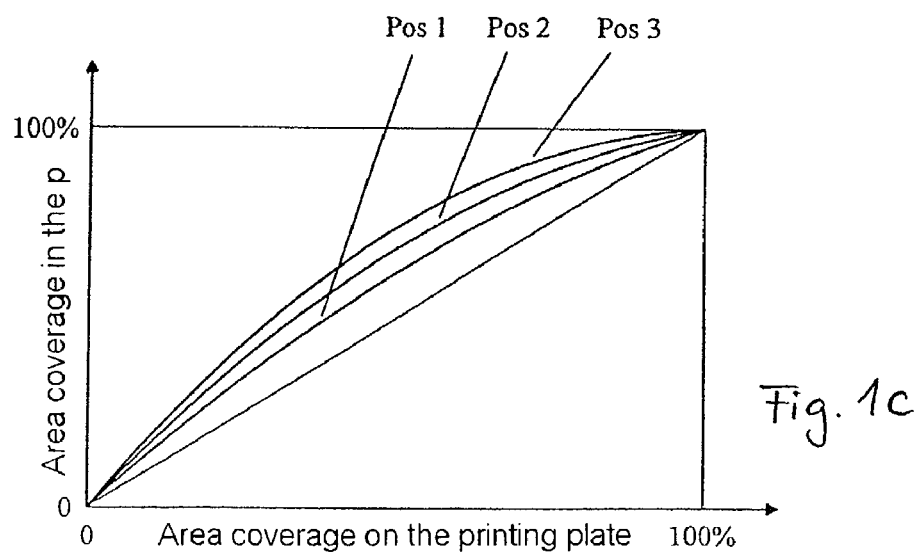
Fig. 1c

METHOD OF PRODUCING A PRINTING PLATE ON A CYLINDRICAL PRINTING-PLATE CARRIER IN A ROTARY PRINTING PRESS

PRIORITY CLAIM

This application claims priority to DE 102 13 708.0 filed Mar. 27, 2002 in Germany.

FIELD OF THE INVENTION

The invention relates to a method of producing a printing-plate on a cylindrical printing-plate carrier in a rotary printing press, in particular in lithographic offset printing, but is not limited to that.

BACKGROUND OF THE INVENTION

The present inventive method utilizes a digital imagesetting system for producing a printing plate for a rotary printing press; especially an offset printing cylinder which can be written on digitally and also erased again.

The printing unit may be a customary offset printing press. In such presses three cylinders, the printing-plate carrier cylinder, the blanket cylinders and the impression cylinders, collectively the printing cylinders, cooperate to create a printed image. The data to be printed, i.e. image information, has been transferred on a printing-plate carrier. Using a principle akin to immiscibility of oil and water, the plate is first dampened with water to prevent non-image areas from absorbing oil based inks. The plate is then inked, and an ink impression is transferred from the printing plate to a blanket cylinder. A blanket made of synthetic and/or natural rubbers is secured to the surface of the blanket cylinder and absorbs the ink. A web of paper or other print material is run between the blanket and impression cylinders. As the blanket cylinder revolves, the ink is deposited on the moving web and the image is printed.

The digital imagesetting unit operates on the external drum principle in known systems from the applicant, in which a laser beam uses the stocks of digital data to define the image information on the surface of the printing cylinder with the printing cylinder rotating rapidly. U.S. Pat. No. 6,580,524 from the applicant, which is hereby incorporated by reference in its entirety, describes a method of controlling the creation of an image on a printing-plate carrier in a printing press. In that document, the applicant discloses that the image signals that create the printing plate, i.e. set the image on the printing plate, are retrieved from a memory of a computer and supplied to a device for creating the image.

A raster image processor (RIP) sets up the scanned image via a bitmap memory in the known system, because the image may be composed of a series of dots and lines of dots. Thus, the device for setting the image, such as a laser, may interpret the digital image data correctly from a PostScript file and giving each image point of the subsequent overall form its identity (tonal value) and its position.

The conversion of a stock of digital image data into half-tone values is, for example, done as follows: in order to be able to convert 256 grey stages into half-tone values, the laser must be capable of subdividing the half-tone cell (the half-tone dot) at the selected halftone fineness into 16×16 addressable half-tone elements. In the event that a full tone were exposed, all 256 half-tone elements would be blackened, and in the event of a half-tone value of, for example, 15%, about 38 half-tone elements would likewise be blackened. Each exposed half-tone dot would in this case be assembled from a bitmap of 256 half-tone elements. The bitmap therefore contains the control information for the laser which, from this, exposes a half-tone dot comprising a corresponding number of pixels.

Printing cylinders provide constant print quality only when they are correctly set-up, for the printing plate cylinder that means a correct transfer pressure. A set-up where the transfer pressure is too low yields non-uniform transport of ink or damping solution, because of the tolerances of circular running and cylindricity. A setting where the transfer pressure is too high prematurely wears the cylinder surface, because of internal friction and pressure overload.

For the purpose of standardization, that is to say quality assurance in offset printing, a suitable electronic concept is currently used, which comprises the control desk technology, as it is known, which is understood to mean the automatic management and monitoring of many sequences during printing. Microprocessors and extremely small computers process a large number of data for this purpose, their results ultimately being passed on to the respective control and regulating elements via an appropriate data bus. Professional scanners (densitometers) currently offer many and various possibilities for correcting the tonal and color values. The (half-)tone value in the print in this case indicates the percentage area ratio of half-tone dots and paper white.

Each change to a half-tone dot in the print has its effect in the ratio between covered and uncovered area. As is known, as a result of the transfer process in offset printing, the half-tone dots become larger in most cases, and in this case one speaks of a tonal value gain in the print. If the half-tone dots of only one color become greater than desired, then the result is a different hue. Of course, this has an effect in the overprint. The most important precondition for agreement between half-tone motifs in the initial print and in the edition print is, however, agreement between the tonal value gain of all the colors and printing points.

The tonal value gain is given by the difference between the known half-tone value on the plate which, as described above, itself results from the RIP as a bitmap together with the tonal value change of the exposure, and from the half-tone value in the print, measured by means of a densitometer, for example. The tonal value gain as a deviation of the half-tone value in the print from the half-tone value of the plate or based on the input data can be represented in a printing characteristic curve that can be used directly for the reproduction.

To determine the printing characteristic curve, stepped half-tone wedges with at least three, or preferably five or more half-tone steps and a full-tone area are printed. The color density in the full-tone and in the half-tone steps is then usually measured with the densitometer and used to determine the half-tone values. If the values obtained in this way are plotted in a graph against the corresponding desired half-tone values, the result is the appropriate printing or transfer characteristic curve. For different combinations of printing ink, paper, printing plate and so on, different transfer characteristic curves are of course used (see U.S. Pat. No. 6,580,524).

A further problem for quality assurance results from the requirement for higher and higher productivity, for example as a result of attempts to produce the most lightweight and cost-effective cylinders. In particular channel-less printing, as it is known, in particular the sleeve technique, which is distinguished by a rubber blanket fitted in a seam-free manner to a sleeve and a printing plate laser-welded to form a cylindrical shape, permits a reduced stiffness, because of the reduced excitation to oscillation owing to the lack of cylinder channels. The length/thickness ratio of the printing cylinder and its relative stiffness with regard to deflection therefore become less and less favourable. The consequence of this is that during printing operation the shape and position of the printing cylinders in relation to one another may change in an undesirable way, that is to say the printing cylinders deflect.

The positional change changes the printing pressure, specifically the transfer pressure of the printing plate interacting in the printing unit. This pressure becomes non-uniform when viewed over the cylinder width. This printing pressure is generally determined in numerical values by measuring what is known as the imprint width, that is to say the width of the zone which defines the contact area of the cylinders when they are set against each other, that is to say moved so as to exert pressure. This measurement is particularly simple in offset printing, since here one cylinder of a pair of cylinders always has a compressible (soft) surface.

The printing or transfer characteristic curve, that is to say the tonal value gain, then depends directly on this imprint width, an increased imprint width meaning an increased tonal value gain and vice versa. The effect described therefore leads to a printing characteristic curve which changes in an undesired manner as viewed over the cylinder width.

In order to stabilize these printing characteristic curve values that vary over the cylinder width, that is to say to compensate for the difference between the desired and actual characteristic curves, attempts have hitherto been made to avoid this positional change of a printing cylinder, caused by deflection, by means of mechanical measures or measures connected with mechanical construction. Known countermeasures to deflection nowadays are, firstly, cylinder surfaces of crowned (convex) design and, secondly, the use of extremely rigid materials, but also a design construction of a cylinder group which permits maximum mutual support of the cylinders, so that the pressure which leads to the positional change is somewhat reduced. However, these measures are currently viewed as being too complicated and too expensive.

SUMMARY OF THE INVENTION

It is an object of the present invention to provide quality assurance in rotary printing with regard to the printing or transfer characteristic curves, in particular in lithographic offset printing, which brings about the compensation of positional changes of printing cylinders owing to deflection in a cost-effective and flexible manner and without mechanical compensation measures.

This and other objects are achieved by providing a method of producing a printing plate on a cylindrical printing-plate carrier in a rotary printing press that uses a digital imagesetting unit and a raster image processor which receives digital image data in a data format that is independent from the printing machine utilized. The method includes subdividing the printing-plate carrier by computation in terms of its width and axial length into at least two circumferential subareas. Then an actual transfer characteristic curve for each subarea is determined and each actual transfer characteristic curve is compared by computation with a predetermined desired printing characteristic curve to find a deviation of the actual transfer characteristic curve from the desired characteristic curve of each subarea. The method further includes calculating a correction to compensate for each deviation; receiving a digital image data in a first data format using the raster image processor, the first data format independent of the printing press; converting the digital image data into machine-specific image data using the raster image processor, the machine-specific image data including the position and the tonal value in the form of a bitmap; applying the correction for a predetermined desired printing characteristic curve for the edition print to the machine-specific image data using the raster image processor; and supplying the machine-specific image data using the raster image processor to the imagesetting unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 1a is an isometric view of the set-up of two cylinders that are in communication with each other with a transfer pressure, where the two cylinders are two printing-plate cylinders or a blanket cylinder and a printing-plate cylinder.

FIG. 1b is a diagram of the line pressure resulting from the deflection of the cylinders, i.e. a positional change, during printing operation, varying over the cylinder width and brought about by the printing pressure.

FIG. 1c is a diagram of the printing characteristic curves resulting from the line pressure varying because of the deflection of the cylinders as depicted in the diagram of FIG. 1b.

DESCRIPTION OF THE PRESENTLY PREFERRED EMBODIMENTS

Figure 2:
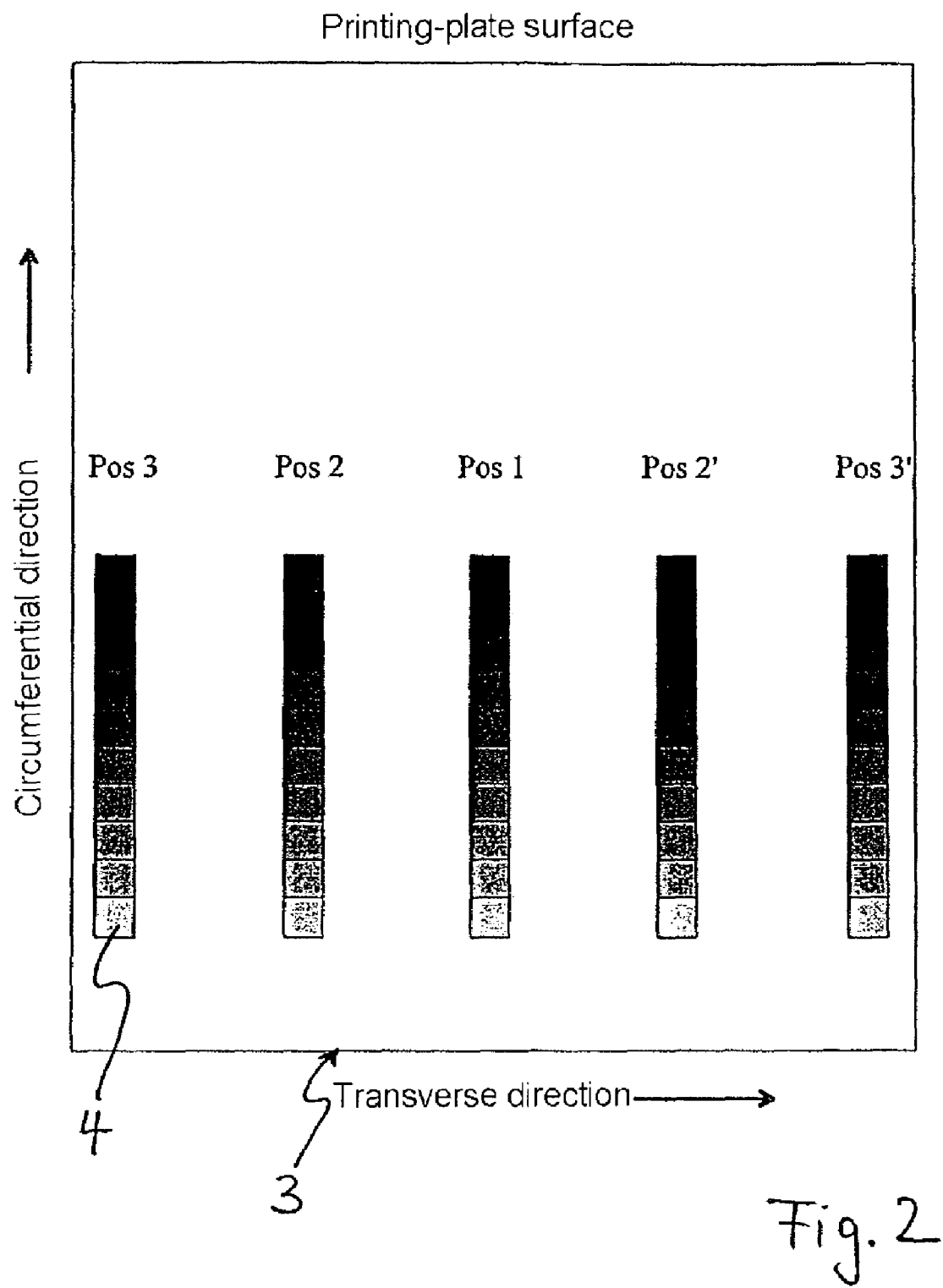
FIG. 2 is a diagramatic illustration of the division of the overall format of a printing plate on the printing-plate carrier into subareas.

The particular advantage of the method according to the present invention resides in the fact that the intended quality assurance of the edition printing is consequently cost-effective and flexible and, in particular, can be adapted to different printing set-ups (FIG. 1a, P—P of two cylinders, for example a printing-plate cylinder 1 and a blanket cylinder 2) and the associated cylinder deflections, without making constructional measures necessary.

Furthermore, FIG. 1b shows the consequences of the undesired positional change (deflection) of the two cylinders 1 and 2 of FIG. 1a in relation to each other during printing operation. The transfer pressure P—P becomes non-uniform over the cylinder width, that is to say a line pressure which is irregular over the cylinder width is produced. In FIG. 1b, position 1 (Pos 1) shows approximately the middle of the cylinder width, position 3 (Pos 3) shows the left-hand edge region and position 3' (Pos 3') shows the right-hand edge region of the cylinder, and positions 2 and 2' (Pos 2, Pos 2') in each case show a subarea of the cylinder (printing-plate carrier) 1 or 2 arranged between middle and edge.

According to the invention, as a development of a method of producing a printing plate on a cylindrical printing-plate carrier in a rotary printing press by means of a digital imagesetting unit and an RIP (Raster Image Processor)

which receives digital image data in a data format that is independent of the printing press, converts these data into machine-specific image data, which comprise the information about the position and the tonal value in the form of a bitmap, and then supplies them to the digital imagesetting unit while taking account of a predefinable desired printing characteristic curve for the edition print, it is proposed that before the production of the printing plate, the printing-plate carrier be repeatedly subdivided by computation in terms of its width and axial length, for each subarea an actual transfer characteristic curve be determined in each case, each actual transfer characteristic curve be compared by computation with the predetermined desired printing characteristic curve, the deviations of the actual characteristic curves from the desired characteristic curve based on each circumferential subarea of the printing-plate carrier be used to compensate the deviations in the form of a computational correction of the machine-specific image data. Thus, FIG. 2 demonstrates the division of a printing-plate width 3 for example into five subareas (zones) Pos 1, 2, 2', 3, 3' which, for the purpose of illustration, correspond to the subareas Pos 1, 2, 2', 3, 3' of FIG. 1b.

In a preferred embodiment, the subareas of the printing-plate carrier are defined as zones Pos 1, 2, 2', 3, 3' in a manner analogous to the inking zones in offset printing and, for each zone, the corresponding actual transfer characteristic curve Pos 1, 2, 3 (FIG. 1c) is determined by measurement with the aid of test prints. In order to provide an idea, the zones are, for example, 30 mm wide.

The determination by measurement of the actual transfer characteristic curve of each zone is then carried out with the aid of stepped half-tone wedges 4, which are printed so as to be associated with each zone in the circumferential direction (see FIG. 2). The determination of a printing characteristic curve, for example in the form of "print area coverage as a function of the area coverage of the printing plate at a given full-tone density", is a standard method in the graphical industry.

For each zone, therefore, the deviation of a corresponding actual transfer characteristic curve from a predetermined desired printing characteristic curve is compensated for in the digital, machine-specific image data. Thus, the desired printing characteristic curve can, for example, be predetermined by standardizing the offset print in accordance with ISO 12647.

In one embodiment, the machine-specific image data converted in the RIP are supplied as an intermediate format to a bitmap memory, and the deviations of the actual transfer characteristic curves from the desired printing characteristic curve corresponding to each subarea for the computational correction of the machine-specific image data into a final format are supplied to the bitmap memory.

For example, to produce the printing plate, the image data are converted into a Contone (CT)/linework (LW) format, taking account of the desired printing characteristic curve as is known in the prior art. The CT/LW format, such as has been used for many years in the field, for example, and is still used nowadays or has also been referred to as a delta list, offers for each color separation at least one bitmap having, for example, 300 dpi with a color depth of at least 8 bits per pixel, into which all the image elements describing grey values enter (Contone data), and one or more highly resolved binary bitmaps, for example with 2400 dpi (Linework data), which contain graphic elements, text elements and-mask information.

These Contone (CT) data in the bitmap (intermediate) memory then have applied to them zone by zone the corrective measures respectively determined by computation for these zones, which lead to easily changeable values in the bitmap, that is to say the grey values are changed in accordance with the deviations determined by computation between the actual characteristic curves and the desired characteristic curve, in such a way that the previously described deviations are compensated for. The intermediate format (CT/LW format) is then transferred into the final format (raster) and the printing plate is then created.

In one embodiment, a basic characteristic curve in the form of an actual transfer characteristic curve belonging to a preferred subarea of the printing-plate carrier is defined as the predetermined desired printing characteristic curve, that is to say a single basic characteristic curve for each printing point at which the method according to the invention is applied, and for each subarea or zone, a correction is calculated on the basis of this basic characteristic curve. The basic characteristic curve can be, for example, the actual transfer characteristic curve of the subarea or zone lying in the middle of the printing-plate carrier or that of the subarea or of the zone between the middle and edge of the printing-plate carrier, preferably spaced about ¼ of the axial length of the printing-plate carrier from its edge.

To produce the printing plate, the image data are again converted into a CT/LW format, preferably of the size of the printing plate, while taking account of the basic characteristic curve. The following correction of the image data is here composed of the known correction of the data for printing-plate production, which for example takes into account the dot broadening as a result of the imagesetting operation, and likewise the correction of the deviations of the actual tonal value gains in the print from the desired tonal value gain.

To produce the printing plate, a dedicated basic characteristic curve is likewise applied to each different printing point. These basic characteristic curves may be slightly different. The respectively determined correction values are then applied, subarea by subarea or zone by zone, to the CT data, so that slightly changed values in the bitmap are produced. The raster is then generated from the CT/LW format and the printing plate is created.

The particular advantage of this procedure is that the changes in the values in the bitmap are only very small, since all relatively coarse corrections have already been calculated in previously, and therefore color displacements resulting from nonlinearities of the color build-up are minimized.

In one embodiment, all the actual transfer characteristic curves, as a function of the transfer pressure of the printing-plate carrier in the printing unit of the rotary printing press, whose numerical values result from the determination of the imprint width of the printing-plate carrier, are determined by computation instead of by measurement. In this case, the deflection of the cylindrical printing-plate carrier is determined, for example, by measuring the changed imprint width under deflection. This deflection results in a change in the transfer pressure, as described at the beginning. Given knowledge of the dependence of the tonal values on the respective transfer pressure, which can be derived either from a mathematical function or empirical determination, it is possible to use a quantitative representation of the deflection to determine the correction characteristic curves, that is to say the actual transfer characteristic curves. As a result, a test print is no longer necessary to determine these correction characteristic curves.

Even the deflection of the printing-plate carrier can be determined on the basis of theoretical calculations using known material parameters and surface and line forces, for example by means of finite element calculation. Thus, a starting correction can be predetermined directly at the factory and without the necessity for test prints and measurements on site.

In a further embodiment, a method in which subdividing the printing-plate carrier by computation is performed without steps, so that, from the first to the last subarea, the actual transfer characteristic curve can be interpolated linearly or polynomially.

In yet a further embodiment, the calculated correction of the machine-specific image data is performed during the conversion of the machine-independent image data in the RIP. This permits the omission of an intermediate format, for example in the CT/LW format as described above. In this case, the correction of the image data can be performed on an object basis in a step carried out before rastering. This can be done, for example, on a printing-plate-related display list. There, individual objects, bitmap or vector objects are then subjected to a conversion, corresponding to their position on the printing plate.

In one embodiment, provision is made for the determination of the actual transfer characteristic curves to be linked to a predefinition of a self-teaching system, so that a database can be used for desired printing characteristic curves for any desired printing point on a rotary printing press, taking account of any desired parameters, such as different paper/ink combinations.

It is possible for the correction measures of the method according to the invention to be the same for the entire printing press, that is to say for every printing point with similar geometric and printing conditions. However, they can also vary from printing point to printing point and, for each printing point, can be determined individually, stored and applied to the data prepared for that printing point. In a self-teaching method, the two can be combined, such as already disclosed in self-teaching systems for optimizing the inking zone presetting in rotary printing presses, for example, U.S. Pat. No 6,230,622 which is hereby incorporated by reference in its entirety.

Therein, an initial correction is predetermined, which results on the basis of experience with already existing machines and theoretical considerations. During the course of the operation of the machine, measurements are then made in the prints produced and, as a result, the correction is improved. This can be done individually for each printing point. The measurements can be carried out by means of handheld measuring instruments or automated measuring devices, separately or within the context of measurements used, for example, for the inking zone presetting.

In order to refine the method according to the invention further, the corrections could be performed on the basis of the printing paper used or the paper/ink combination used, for example in a classification of the paper classes in accordance with ISO 12647. It would then be necessary to use the respectively associated correction for each paper class used in order to generate the printing plate.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of producing a printing plate on a cylindrical printing-plate carrier in a rotary printing press using a digital imagesetting unit and a raster image processor, comprising the steps of:
   (a) subdividing the printing-plate carrier by computation in terms of its width and axial length into at least two circumferential subareas;
   (b) determining an actual transfer characteristic curve for each subarea,
   (c) comparing each actual transfer characteristic curve by computation with a predetermined desired printing characteristic curve to find a deviation of the actual transfer characteristic curve from the desired characteristic curve of each subarea;
   (d) calculating a correction to compensate for each deviation;
   (e) receiving digital image data in a first data format using the raster image processor, the first data format independent of the printing press;
   (f) converting the digital image data into machine-specific image data using the raster image processor, the machine-specific image data including a position and a tonal value in the form of a bitmap;
   (g) applying the correction for a predetermined desired printing characteristic curve for an edition print to the machine-specific image data using the raster image processor; and
   (h) supplying the machine-specific image data using the raster image processor to the digital imagesetting unit.

2. The method of claim 1, wherein
   step (a) further includes
      subdividing the printing-plate carrier into at least two subareas, each subarea being an inking zone in offset printing and
   step (b) further includes
      determining an actual transfer characteristic curve for each subarea by measurement using test prints.

3. The method of claim 2, wherein step (b) further includes
   measurement is carried out using stepped half-tone wedges, which are printed so as to be associated transversely with the circumference of each subarea.

4. The method of claim 1, wherein step (a) further includes
   performing the computation without steps, so that from the first to the last subarea, the actual transfer characteristic curve can be interpolated linearly or polynomially.

5. The method of claim 1, wherein the actual transfer characteristic curve associated with a preferred subarea of the printing-plate carrier is the predetermined desired printing characteristic curve.

6. The method of claim 1, wherein the predetermined desired printing characteristic curve is a characteristic curve defined by the standardization of the offset print in accordance with ISO 12647.

7. The method of claim 5, further including between steps (b) and (c) the steps of assigning a basic characteristic curve which, viewed in the axial direction, to a subarea of the printing-plate carrier arranged between middle and edge, and preferring the basic characteristic curve as the predetermined desired printing characteristic curve.

8. The method of claim 1, wherein step (b) further includes determining an imprint width of the printing-plate carrier, associating numerical values of a transfer pressure with the imprint width of the printing plate carrier; and determining the actual transfer characteristic curves by computation as a function of the transfer pressure of the printing-plate carrier in the printing unit of the rotary printing press.

9. The method of claim 8, wherein step (b) further includes deriving the numerical values of the transfer pressure from a finite element calculation of the deflection of the printing-plate carrier in the printing unit.

10. The method of claim 1, wherein step (h) further includes supplying the machine-specific image data is in an intermediate form to a bitmap memory, and supplying to the bitmap memory the deviations of the actual transfer characteristic curves from the desired printing characteristic curve corresponding to each subarea are supplied in a final format for the purpose of computational correction of the machine-specific image data.

11. The method of claim 1, wherein step (g) is performed with step (f).

* * * * *